United States Patent [19]
Dawe

[11] Patent Number: 5,385,514
[45] Date of Patent: Jan. 31, 1995

[54] HIGH RATIO PLANETARY TRANSMISSION

[75] Inventor: Daniel J. Dawe, Austin, Tex.

[73] Assignee: Excelermalic Inc., Austin, Tex.

[21] Appl. No.: 104,567

[22] Filed: Aug. 11, 1993

[51] Int. Cl.[6] .............................................. F16H 1/32
[52] U.S. Cl. ................................... 475/336; 475/338; 475/340; 475/341; 475/346
[58] Field of Search ............... 475/249, 331, 336, 338, 475/339, 340, 341, 346, 347; 74/410

[56] References Cited

U.S. PATENT DOCUMENTS

| | | | |
|---|---|---|---|
| 3,596,538 | 8/1971 | Braun | 475/341 X |
| 3,686,978 | 8/1972 | Knoblach et al. | 475/340 X |
| 4,106,366 | 8/1978 | Altenbokum et al. | 74/410 X |
| 5,240,462 | 8/1993 | Mochizuki et al. | 475/341 X |
| 5,242,336 | 9/1993 | Hori | 475/338 X |

Primary Examiner—Charles A. Marmor
Assistant Examiner—Mary Ann Battista
Attorney, Agent, or Firm—Klaus J. Bach

[57] ABSTRACT

In a high ratio planetary transmission which includes in a housing coaxial input and output shafts and wherein a first sun roller structure is part of one of the shafts and disposed within the housing, a first traction ring is disposed within the housing around the first sun roller structure in spaced relationship therefrom, and a number of planetary traction rollers are supported in the space between the sun roller structure and the first traction ring, each traction roller has two sections of different diameters, one in engagement with the first traction ring and with the sun roller structure and the other being in engagement with a second traction ring which is operatively connected for rotation with the other of the input and output shafts.

11 Claims, 4 Drawing Sheets

HIGH RATIO PLANETARY TRANSMISSION

BACKGROUND OF THE INVENTION

The invention relates to a planetary type transmission with a high transmission ratio.

Such high ratio transmissions are needed for converting rotary motion of a high speed motor shaft, for example, for low speed, high torque applications.

In order to achieve extremely high transmission ratios it is generally necessary to use several transmission stages. This can also be achieved however by a differential arrangement of a planetary transmission with planetary gears having each two sections of different diameters, that is, with a slightly different number of teeth, wherein the sun gear of the planetary transmission and a stationary gear ring each is in engagement with one diameter section and a rotatable gear ring which is connected to the transmission output shaft is in engagement with the other diameter section of the planetary gears. The smaller the difference between the two diameter sections the larger is the transmission ratio, the largest ratio being present if the difference between the two diameter sections is only one tooth. It is noted however that such transmissions develop such large torques that they require a shear pin or a slipping clutch to protect the transmission from overloads in extreme overload situations, for example, if the load locks up.

It is the object of the present invention to provide such a differential type high ratio planetary type transmission which is inherently protected from overloads, which permits to provide for any design ratio and which is relatively inexpensive to manufacture.

SUMMARY OF THE INVENTION

In a high ratio planetary transmission which includes in a housing coaxial input and output shafts and wherein a first sun roller structure is part of one of the shafts and disposed within the housing, a first traction ring is disposed within the housing around the first sun roller structure in spaced relationship therefrom, and a number of planetary traction rollers are supported in the space between the sun roller structure and the first traction ring, each traction roller has two sections of different diameters, one in engagement with the first traction ring and with sun roller structure and the other being in engagement with a second traction ring which is operatively connected for rotation with the other of the input and output shafts.

With this transmission, creeping will only increase somewhat when an overload occurs allowing for zero output speed while the maximum transmission design torque will remain. The contact surfaces are lubricated so that the increased creeping will cause no damage to the transmission.

DESCRIPTION OF THE PREFERRED EMBODIMENTS

Figure 1:
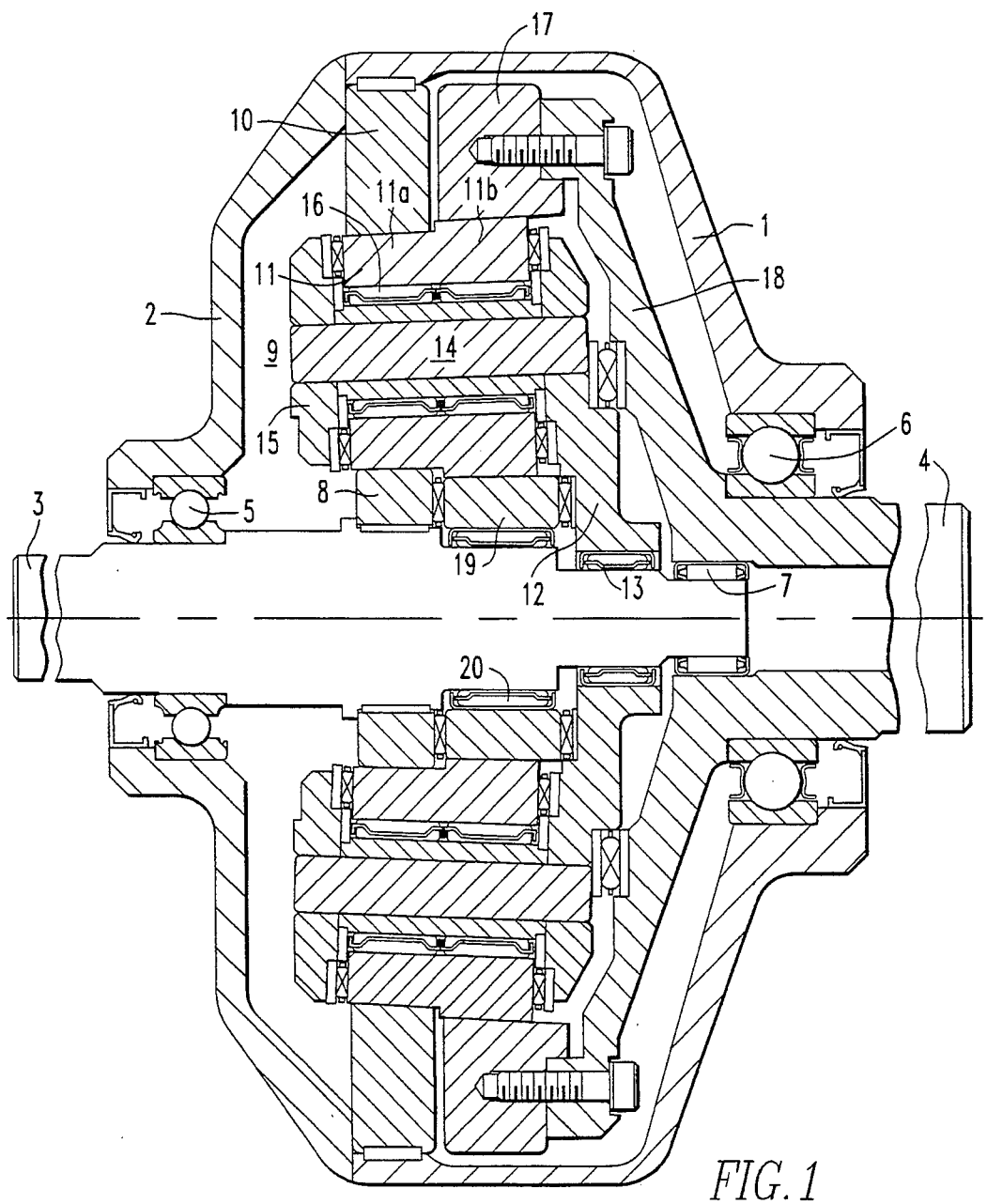
FIG. 1 shows a planetary traction roller transmission with predetermined engagement forces.

As shown in FIG. 1 the transmission includes a housing 1 which receives the transmission structure and is provided with a cover 2. Coaxial input and output shafts 3 and 4 are rotatably supported in the housing cover 2 and in the housing 1 by antifriction bearings 5 and 6. At its inner end the input shaft 3 is supported in the output shaft 4 by a needle bearing 7. Centrally within the housing 1 the input shaft 3 has a sun roller structure 8 firmly mounted thereon which forms the center roller of a first planetary traction roller structure 9 including a stationary first traction ring 10 supported in the housing 1 in spaced relationship from the sun roller structure 8 and a set of planetary type traction rollers 11 disposed in the space between the ring 10 and the sun roller structure 8 and in motion-transmitting engagement with both of them. The traction rollers 11 are rotatably supported on a first planetary roller support disc 12 which does not need to, but preferably is, rotatably supported on the input shaft 3 by a roller bearing 13. It includes for each planetary traction roller 11 a support shaft 14 which is supported at its free end by a support ring 15 and on which the planetary traction roller 11 is supported by a bearing structure 16. The planetary traction rollers 11 include two sections 11a and 11b of slightly different diameters, the section 11a being in engagement with the stationary traction ring 10 and the sun roller structure 8 and the other section 11b being in engagement with a second traction ring 17 which is mounted for rotation with the output shaft 4 via a support disc 18. In the center between the sections 11b of the planetary traction rollers 11 there is preferably provided a support sun roller 19 which is hollow so that the input shaft 3 may extend therethrough and which may be supported on the input shaft 3 by a pilot bearing 20. Various axial thrust bearings are provided for the accommodation of the axial forces in the transmission. They are not denoted by numerals and not further described since their function is apparent from the drawings. It is noted, however, that the support shafts 14 of the planetary traction rollers 11 are arranged at a slight angle with respect to the axis of the input and output shafts and that the traction surfaces of the planetary traction rollers 11 are slightly conical and also the traction surfaces of the stationary first traction ring 10 and of the rotatable second traction ring 17 are correspondingly conical so that, when the planetary traction rollers 11 are forced into the conical space defined by the traction rings upon assembly of the transmission, predetermined traction surface contact forces are generated.

Operation of the Transmission

Rotation of the input shaft in one direction causes the traction rollers 11 to roll along the traction surface of the fixed traction ring 10 and also along the traction surface of the rotatable traction ring 17. As shown in FIG. 1 however the diameter of the planetary traction roller section 11b is somewhat larger than that of the planetary traction roller section 11a so that the circumferential speed of the traction roller section 11b is somewhat larger than that of the traction roller section 11a providing for a speed differential which causes the rotatable traction ring to rotate in a direction opposite to the input shaft at a slow speed corresponding to the difference in diameter between the traction roller sections 11a and 11b. It is noted that traction roller section 11a could be chosen to be larger in diameter than section 11b resulting in rotation of the output shaft in the same direction as the input shaft again at a speed corresponding to the difference in diameter between the two traction roller sections.

In any case, by choosing the difference in diameter of the two traction roller sections, any desired high transmission ratio can be obtained. It is noted that such a high transmission ratio is obtained with traction surfaces which have relatively small differences in curvature and which therefore are not subjected to unduly high surface pressures and which, operating always at relatively high contact speeds—in spite of the low speed of the output shaft 4—provide for adequate lubrication of the contact areas of the traction surfaces.

It is furthermore noted that traction roller surfaces will always have some creep depending on the load. If in the arrangement according to the present invention the load becomes extremely high, for example, when the load locks up, the traction roller contact surfaces will be creeping at relatively low non-destructive levels thereby accommodating zero output speed while maintaining maximum torque on the output shaft. No slip clutch or shear pin is therefore required to protect the transmission.

In the arrangement as shown in FIG. 1 no torque-dependent axial loading structure is provided; rather, the traction surfaces are engaged with one another with a predetermined design contact force and such drives are useful therefore in relatively constant torque applications with little chance of overloads and little operating time at low or no load.

Figure 2:
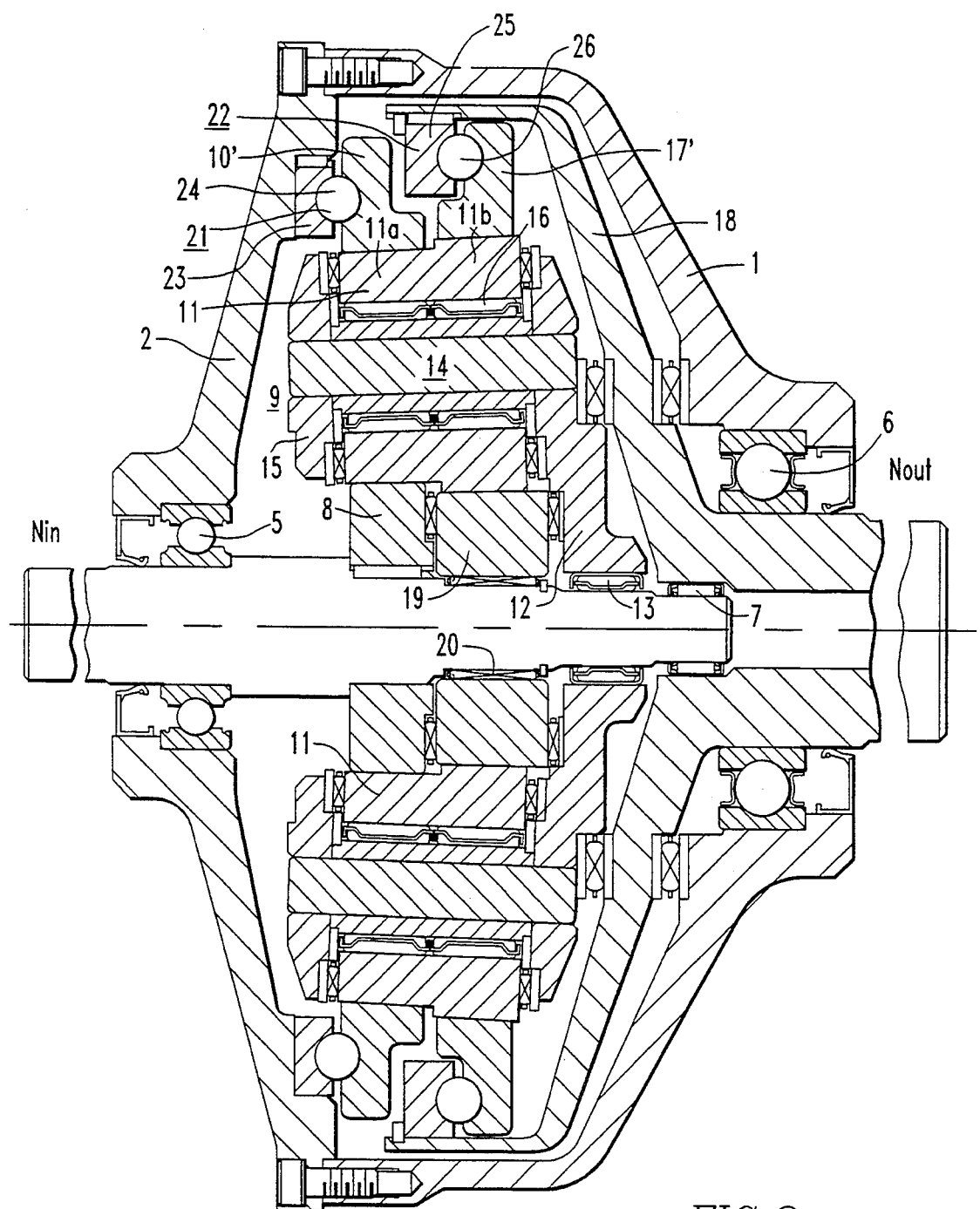
FIG. 2 shows a similar arrangement which, however, includes cam structures to provide torque-dependent engagement forces.

FIG. 2 shows a transmission arrangement in which, for each traction ring, an axial cam structure is provided which forces the respective traction ring with its conical traction surface onto the respective conical planetary traction roller section with a force which is dependent on the torque transmitted through the transmission.

As the arrangement shown in FIG. 2 is essentially the same as that of FIG. 1 the same reference numerals are used where appropriate. However, the traction rings 10' and 17' are different in that they are not firmly mounted on the housing 2 and the support disc 18 respectively. Rather, there are provided for the traction rings axial cam structures 21 and 22 which force the respective traction rings 10' and 17' axially onto the traction roller sections 11a and 11b with a force that depends on the reaction forces applied to the traction rings 10' and 17'.

The axial cam structure 21 includes a cam ring 23 mounted on the housing and bearing balls 24 disposed between the cam ring 23 and the traction ring 10'. The cam surface structure may, of course, also be arranged on the traction ring 10' or it may be formed on both the cam ring 23 and the traction ring 10'.

The cam structure 22 likewise includes a cam ring 25 mounted on the support disc 18 and bearing balls 26 disposed between the cam ring 25 and the traction ring 17'. Again the axial cam surfaces may also be provided on the traction ring 17' or on both the cam ring 25 and the traction ring 17'.

Figure 3:
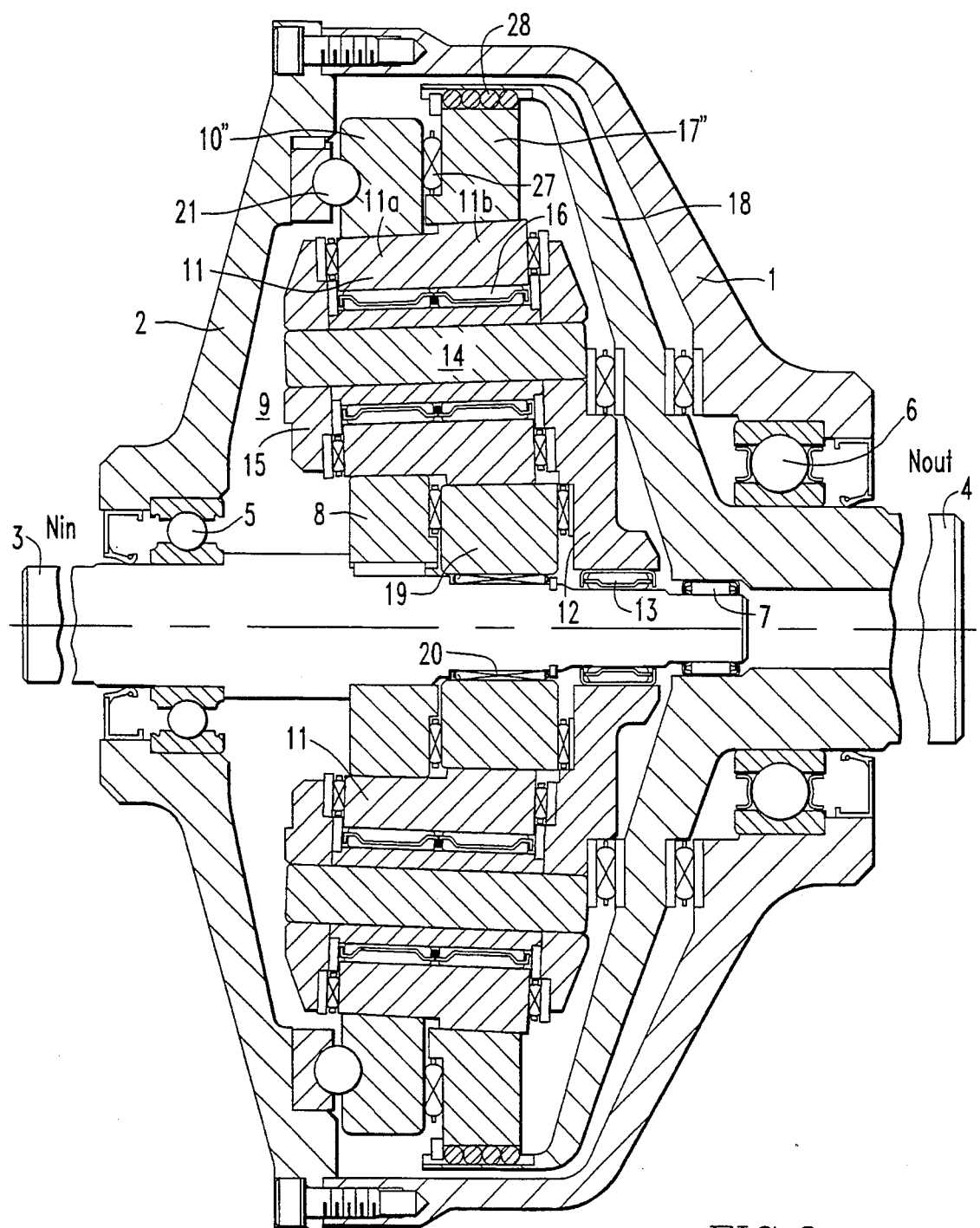
FIG. 3 shows an arrangement similar to FIG. 2 but with a single cam structure providing torque-dependent engagement forces for both traction rings.

In the arrangement according to FIG. 3 only one cam structure, that is, cam structure 21, is utilized to provide for the appropriate engagement forces for both traction rings 10'' and 17''. An axial thrust bearing 27 is disposed between the two traction rings for the transmission of axial forces from the traction ring 10'' to the traction ring 17'' which is axially movably supported on the support disc 18 by a linear bearing structure 28.

Figure 4:
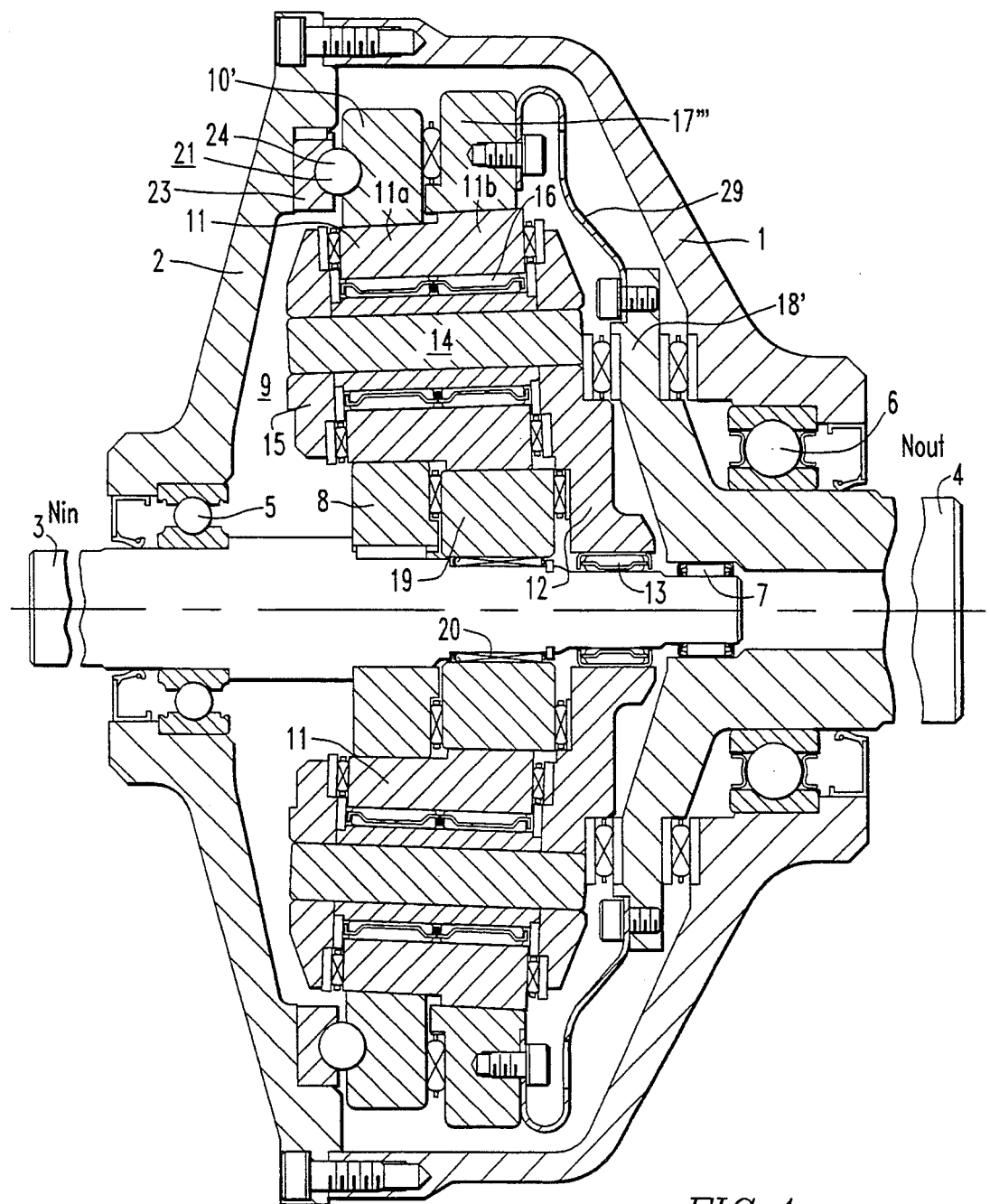
FIG. 4 shows an arrangement similar to FIG. 3 wherein one of the traction rings is axially resiliently supported by a flexible plate structure.

In the arrangement according to FIG. 4 which is essentially the same as that shown in FIG. 3, the traction ring 17''' is coaxially movably supported by a flexible drive plate structure 29 which is bolted at its outer end to the traction ring 17''' and, at its inner end, to the drive disc 18' for transmitting rotational movement from the traction ring 17''' to the drive disc 18' and the output shaft 4 while permitting slight axial movement of the traction ring 17''' relative to the drive disc 18'.

What is claimed is:

1. A planetary type traction roller transmission comprising: a housing, coaxial input and output shafts rotatably supported in said housing, a first sun roller structure associated with one of said input and output shafts in said housing, a first traction ring disposed in said housing around said first sun roller structure and having a traction surface spaced from said first sun roller structure, a number of planetary traction rollers supported in the space between said first sun roller structure and the traction surface of said first traction ring, said planetary traction rollers each having two sections of different diameters, one section being in engagement with the traction surface of said first traction ring and said first sun roller structure, and a second traction ring operatively connected for rotation with the other of said input and output shafts and surrounding the second sections of said planetary traction rollers and being in engagement therewith for the transmission of motion between said second planetary roller section and said second traction ring, said planetary traction rollers being supported with their axes slightly inclined with respect to the axis of the input and output shafts and the surfaces of said two sections of the planetary traction rollers being slightly conical and the traction surfaces of said traction rings being also conical according to the respective planetary traction roller section surfaces to provide for radial engagement of the traction surfaces by axial engagement forces between the planetary traction rollers and the traction rings.

2. A traction roller transmission according to claim 1, wherein a second sun roller structure is disposed adjacent said first sun roller structure and sized so as to fit into the space surrounded by said second section of said planetary traction rollers in order to provide radial support for the second sections of the planetary traction rollers.

3. A traction roller transmission according to claim 2, wherein said one shaft extends through said second sun roller structure and is rotatably supported in said other shaft.

4. A traction roller transmission according to claim 3, wherein said second sun roller structure is rotatably supported on said one shaft by a pilot bearing.

5. A traction roller transmission according to claim 3, wherein said planetary traction rollers are rotatably supported on support shafts mounted at opposite ends to planetary traction roller support rings disposed at opposite ends of said planetary traction rollers.

6. A traction roller transmission according to claim 5, wherein at least one of said traction roller support rings is a support disc with a central opening receiving said input shaft and being rotatably supported thereon by a bearing.

7. A traction roller transmission according to claim 1, wherein a first axial cam structure is arranged between said first traction ring and said housing for axially forcing said first traction ring onto said first planetary traction roller sections with a force depending on the reaction torque force applied to the first traction ring by the planetary traction rollers.

8. A traction roller transmission according to claim 7, wherein said other shaft includes a drive disc extending around said second traction ring and a second axial cam structure is connected to said drive disc for axially forcing said second traction ring onto said second traction roller sections with a force depending on the reaction torque force applied to the second traction ring by the planetary traction rollers.

9. A traction roller transmission according to claim 7, wherein said other shaft includes a drive disc extending around said second traction ring and said second traction ring is axially but not rotationally movably supported on said drive disc and an axial thrust bearing is disposed between said first and second traction rings for transmitting axial engagement forces from said first to said second traction ring.

10. A traction roller transmission according to claim 9, wherein said second traction ring is supported on said drive disc via a linear bearing structure.

11. A traction roller transmission according to claim 1, wherein said second shaft includes a drive disc disposed adjacent said first planetary roller support disc and said second traction ring is supported on said drive disc by a flexible drive plate structure connected at its outer end to said second traction ring and at its inner end to said drive disc.

* * * * *